(12) United States Patent
Su et al.

(10) Patent No.: US 11,644,393 B2
(45) Date of Patent: May 9, 2023

(54) LOW-ENERGY-CONSUMPTION IN-SITU EXTRACTION SYSTEM FOR LUNAR RARE GAS AND EXTRACTION METHOD

(71) Applicants: Institute of Geology and Geophysics, Chinese Academy of Sciences, Beijing (CN); Institute of Atmospheric Physics, Chinese Academy of Sciences, Beijing (CN)

(72) Inventors: Fei Su, Beijing (CN); Huaiyu He, Beijing (CN); Ranran Liu, Beijing (CN); Ziheng Liu, Beijing (CN); Jiannan Li, Beijing (CN)

(73) Assignees: Institute Of Geology and Geophysics, Chinese Academy of Sciences, Beijing (CN); Institute of Atmospheric Physics, Chinese Academy of Sciences, Beijing (CN)

( * ) Notice: Subject to any disclaimer, the term of this patent is extended or adjusted under 35 U.S.C. 154(b) by 190 days.

(21) Appl. No.: 17/105,151

(22) Filed: Nov. 25, 2020

(65) Prior Publication Data

US 2021/0156769 A1    May 27, 2021

(30) Foreign Application Priority Data

Nov. 26, 2019 (CN) .......................... 201911172554.9

(51) Int. Cl.
  *G01N 1/28* (2006.01)
  *G01N 1/22* (2006.01)
  *G01N 1/44* (2006.01)

(52) U.S. Cl.
  CPC ........... *G01N 1/2294* (2013.01); *G01N 1/286* (2013.01); *G01N 1/44* (2013.01); *G01N 2001/2866* (2013.01)

(58) Field of Classification Search
  CPC ........ G01N 1/2294; G01N 1/286; G01N 1/44; G01N 2001/2866; G01N 1/22; G01N 2001/2244
  USPC .. 73/23.2, 19.01, 19.12, 31.07, 863, 863.21, 73/864.91, 866; 366/139, 140
  See application file for complete search history.

(56) References Cited

FOREIGN PATENT DOCUMENTS

| CN | 102967667 | * | 3/2013 |
| CN | 204051782 | * | 12/2014 |
| CN | 206684155 | * | 11/2017 |
| CN | 106644629 | * | 8/2019 |

\* cited by examiner

*Primary Examiner* — Robert R Raevis
(74) *Attorney, Agent, or Firm* — Evan Law Group LLC

(57) ABSTRACT

The present disclosure provides a low-energy-consumption in-situ extraction system for lunar rare gas and an extraction method. The system includes a screening device, a grinding device and a heating device. The method includes: a. using a robot arm to collect lunar soil and put into the screening device, and screening lunar soil with a particle size below 100 μm; b. adding and grinding screened lunar soil in the grinding device; c. adding and heating ground lunar soil in the heating device to 150-250° C., and releasing rare gases adsorbed. The present disclosure uses screening, grinding combined with traditional heating methods to achieve low power consumption in extracting rare gases on the surface of the moon, and extraction power consumption is only 10-30% of the power consumption of hot-melt extraction at 900° C. in the prior art, which is beneficial to promote the lunar resource utilization.

18 Claims, 1 Drawing Sheet

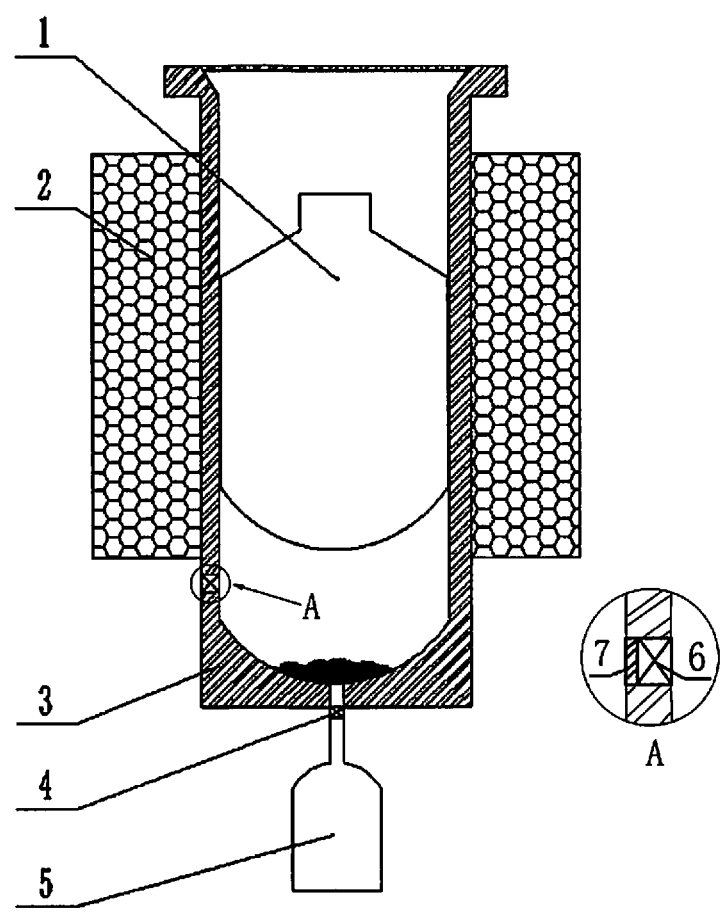

LOW-ENERGY-CONSUMPTION IN-SITU EXTRACTION SYSTEM FOR LUNAR RARE GAS AND EXTRACTION METHOD

TECHNICAL FIELD

The invention relates to the technical field of lunar soil treatment, in particular to a low-energy-consumption in-situ extraction system for lunar rare gas and an extraction method.

BACKGROUND

Lunar soil contains various scientific information of the solar system, and is a valuable sample for exploring the historical evolution of the solar system and the universe. The lunar soil contains rich mineral resources such as silver, cadmium, lead, tin, titanium, iron, etc., and is a rare treasure trove of long-term research, development and utilization in the future; the lunar soil is located on the lunar surface that is easy to mine, and is the first choice for the construction of lunar bases, mining, road construction, and resource extraction in the future.

Rare gases on the lunar surface, such as helium (He) and xenon (Xe), are important energy sources for deep space exploration in the future, and there is a need for an effective low-energy-consumption lunar surface extraction method. At present, the extraction of rare gases from minerals on the ground is mainly based on heating and melting. The extraction method on the lunar surface also directly heats and melts the lunar soil at high temperature to release rare gases. Due to the heating and melting, the lunar soil needs to be heated to above 900° C., which consumes a lot of energy, is difficult to achieve on the lunar surface on a large scale, and severely restricts the use of rare gases on the lunar surface and the development of lunar resources.

SUMMARY

An objective of the present disclosure is to provide a low-energy-consumption in-situ extraction system for lunar rare gas and an extraction method to solve the problems in the prior art, change the traditional rare gas extraction method, and reduce the energy consumption of in-situ extraction of rare gas on the lunar surface.

To achieve the above objective, the present disclosure provides the following solutions:

The present disclosure provides a low-energy-consumption in-situ extraction system for lunar rare gas, including a screening device, a grinding device and a heating device;

where one end of the grinding device is connected with the heating device, and the other end is connected with the screening device;

both the grinding device and the heating device are in a sealed environment, and are connected by a closed pipe;

the grinding device comprises a housing, a hammer body and an electromagnetic drive system;

the electromagnetic drive system is arranged outside the housing; and the hammer body is arranged inside the housing and matches the housing.

Further, the grinding device further may include a feed inlet and a discharge outlet.

Further, both the feed inlet and the discharge outlet may be sealed by valves.

Further, the screening device may be a screen, with a screen aperture of 100 μm.

Further, the heating device may be a high-temperature furnace.

Further, the grinding device and the heating device may be connected by a stainless steel pipe.

The present disclosure further provides a rare gas extraction method using the low-energy-consumption in-situ extraction system for lunar rare gas, including the following steps:

a. sample preparation: screening a collected original lunar soil sample to obtain a lunar soil sample with a particle size below 100 μm;

b. grinding: grinding a screened lunar soil sample under vacuum until the particle size is less than 1 μm; and c. heating ground lunar soil to 150-250° C. under vacuum to collect rare gases adsorbed.

Further, heating temperature in step c may be 200° C.

The present disclosure provides the following technical effects:

Because there is no atmosphere and magnetic field on the moon, solar wind formed by high-speed charged particle flow can directly reach the moon. Therefore, the lunar soil is rich in rare gas elements such as helium formed by the accumulation of solar wind particles, which is an important energy source in the future. Since injected components of the solar wind are concentrated in the fine-grained lunar soil with large specific surface, screening technology can improve extraction efficiency. More importantly, the injected components of the solar wind are concentrated in the thickness range of 2,000 Å on the surface of the particle, and due to hundreds of millions of years of solar wind injection, the lattice of this layer is severely damaged, and the rare gases can be effectively extracted by grinding with low power consumption. Therefore, the present disclosure uses screening, grinding combined with traditional heating methods to achieve low power consumption in extracting rare gases on the surface of the moon, and extraction power consumption is only 10-30% of the power consumption of hot-melt extraction at 900° C. in the prior art, which is beneficial to promote the lunar resource utilization.

BRIEF DESCRIPTION OF THE DRAWINGS

To explain the embodiments of the present disclosure or the technical solutions in the prior art more clearly, the following will briefly introduce the drawings required in the embodiments. Obviously, the drawings in the following description are only some of the embodiments of the present disclosure, and other drawings may be obtained by those of ordinary skill in the art based on these drawings without creative efforts.

FIG. 1 is a schematic diagram of the grinding device structure of the low-energy-consumption in-situ extraction system for lunar rare gas, in which an enlargement A revealing an example arrangement of a feed inlet is further shown;

where 1 presents a hammer body, 2 presents an electromagnetic drive system, 3 presents a housing, 4 presents a discharge outlet, 5 presents a heating device, 6 presents a feed inlet, and 7 presents a screening device.

DETAILED DESCRIPTION

Various exemplary embodiments of the present disclosure will now be described in detail. The detailed description should not be construed as limiting the present disclosure, but should be understood as a more detailed description of certain aspects, features, and embodiments of the present disclosure.

It should be understood that the terms described in the present disclosure are only used to describe specific embodiments and are not intended to limit the present disclosure. In addition, for the numerical range in the present disclosure, it should be understood that each intermediate value between the upper limit and the lower limit of the range is also specifically disclosed. Each smaller range between any stated value or intermediate value in the stated range and any other stated value or intermediate value in the stated range is also included in the present disclosure. The upper and lower limits of these smaller ranges can independently be included or excluded from the range.

Unless otherwise stated, all technical and scientific terms used herein have the same meaning as commonly understood by those of ordinary skill in the art described in the present disclosure. Although the present disclosure describes only preferred methods and materials, any methods and materials similar or equivalent to those described herein can also be used in the practice or testing of the present disclosure. All documents mentioned in this specification are incorporated by reference to disclose and describe methods and/or materials related to the documents. In case of conflict with any incorporated documents, the content of this specification shall prevail.

It is obvious to those skilled in the art that various modifications and variations can be made to the specific implementation of the present specification without departing from the scope or spirit of the present disclosure. Other embodiments derived from the description of the present disclosure will be obvious to the skilled person. The specification and embodiments of the present application are merely exemplary.

As used herein, "comprising", "including", "having", "containing", etc. are all open-ended terms, which means including but not limited to.

The embodiment of the present disclosure provides a low-energy-consumption in-situ extraction system for lunar rare gas, including a screening device, a grinding device and a heating device 5;

where one end of the grinding device is connected with the heating device 5, and the other end is connected with the screening device;

both the grinding device and the heating device 5 are in a sealed environment, and are connected by a closed pipe.

As shown in FIG. 1, the grinding device includes a housing 3, a hammer body 1, an electromagnetic drive system 2, a feed inlet 6, a discharge outlet 4 and a screen 7.

The feed inlet 6 is arranged on the side of the grinding device and is used to add a screened lunar soil sample to the grinding device. The discharge outlet 4 is arranged at the bottom of the grinding device and is used to add ground lunar soil to the heating device 5; the heating device 5 and the discharge outlet 4 is connected through a stainless steel pipe; the feed inlet 6 and the discharge outlet 4 are controlled by valves to open and close to ensure the tightness of the grinding device.

The electromagnetic drive system 2 is arranged outside the housing 3;

the hammer body 1 is arranged inside the housing 3 and matches the housing 3.

The electromagnetic drive system 2 is an electromagnetic coil that surrounds the outside of the housing 3. The electromagnetic coil is a copper cable, and the electromagnetic coil is connected to the cable. After the current is applied, the electromagnetic coil generates a magnetic field, causing the hammer body 1 to reciprocate and crush the lunar soil.

The screening device is a screen 7, with a screen aperture of 100 μm.

The heating device 5 is a high-temperature furnace.

The grinding device and the heating device 5 are connected by a stainless steel pipe, and valves are provided as required.

The lunar soil is heated by the heating device to release rare gases, and lunar rare gases include He, neon (Ne), argon (Ar) and the like.

The embodiment of the present disclosure provides a low-energy-consumption extraction method for in-situ lunar rare gas, including the following steps:

a. sample preparation: screening a collected original lunar soil sample to obtain a lunar soil sample with a particle size below 100 μm;

b. grinding: grinding a screened lunar soil sample under vacuum until the particle size is less than 1 μm; and c. heating ground lunar soil to 150-250° C. under vacuum to collect rare gases adsorbed.

To further optimize the technical solution, heating temperature in step c may be 200° C.

In the above technical solution, the grinding device and the heating device are in a closed environment. The grinding device uses the principle of electromagnetic induction to reciprocate the hammer body, thereby achieving the grinding effect that destroys the 0.1 μm rare gas-rich layer on the surface layer of the lunar soil particles.

Three sets of comparative tests were carried out under the same conditions with a high-temperature furnace heated to 900° C. in a ground test room and a high-temperature furnace heated to 200° C. according to the present disclosure. The results showed that, under the condition of the same or similar results of gas extraction in the test, the power consumption of the high temperature furnace heated to 900° C. was about 1 KW, but using the grinding and heating method of the present disclosure, the grinding energy consumption was 10 W or even lower; subsequently, using the high-temperature furnace heated to about 200° C., the power consumption could be reduced to 200 W.

The above-mentioned embodiments are only intended to describe the preferred modes of the present disclosure and not intended to limit the scope of the present disclosure. Various alterations and improvements made by those of ordinary skill in the art based on technical solutions of the present disclosure without departing from the design spirit of the present disclosure shall fall within the scope of the appended claims of the present disclosure.

What is claimed is:

1. A low-energy-consumption in-situ extraction system for lunar rare gas, comprising a screening device, a grinding device and a heating device;

wherein a bottom wall of the grinding device is connected with the heating device, and a side wall of the grinding device is connected with the screening device;

the grinding device and the heating device are connected by a closed pipe in a sealed manner;

the grinding device comprises a housing, a hammer body and an electromagnetic drive system;

the electromagnetic drive system is arranged outside the housing; and the hammer body is arranged inside the housing and is shaped to match a shape of the housing.

2. The low-energy-consumption in-situ extraction system for lunar rare gas according to claim 1, wherein the grinding device further comprises a feed inlet at the side wall and a discharge outlet at the bottom wall.

3. A rare gas extraction method using the low-energy-consumption in-situ extraction system for lunar rare gas according to claim 2, comprising the following steps:
   a. screening a collected original lunar soil sample to obtain a screened lunar soil sample with a particle size below 100 μm;
   b. grinding the screened lunar soil sample under vacuum until the particle size is less than 1 μm, to obtain ground lunar soil; and
   c. heating the ground lunar soil to 150-250° C. under vacuum to collect rare gases adsorbed.

4. The rare gas extraction method according to claim 3, wherein heating temperature in step c is 200° C.

5. The low-energy-consumption in-situ extraction system for lunar rare gas according to claim 2, wherein both the feed inlet and the discharge outlet are sealed by valves.

6. A rare gas extraction method using the low-energy-consumption in-situ extraction system for lunar rare gas according to claim 5, comprising the following steps:
   a. screening a collected original lunar soil sample to obtain a screened lunar soil sample with a particle size below 100 μm;
   b. grinding the screened lunar soil sample under vacuum until the particle size is less than 1 μm, to obtain ground lunar soil; and
   c. heating the ground lunar soil to 150-250° C. under vacuum to collect rare gases adsorbed.

7. The rare gas extraction method according to claim 6, wherein heating temperature in step c is 200° C.

8. The low-energy-consumption in-situ extraction system for lunar rare gas according to claim 1, wherein the screening device is a screen, with a screen aperture of 100 μm.

9. A rare gas extraction method using the low-energy-consumption in-situ extraction system for lunar rare gas according to claim 8, comprising the following steps:
   a. screening a collected original lunar soil sample to obtain a screened lunar soil sample with a particle size below 100 μm;
   b. grinding the screened lunar soil sample under vacuum until the particle size is less than 1 μm, to obtain ground lunar soil; and
   c. heating the ground lunar soil to 150-250° C. under vacuum to collect rare gases adsorbed.

10. The rare gas extraction method according to claim 9, wherein heating temperature in step c is 200° C.

11. The low-energy-consumption in-situ extraction system for lunar rare gas according to claim 1, wherein the heating device is a high-temperature furnace.

12. A rare gas extraction method using the low-energy-consumption in-situ extraction system for lunar rare gas according to claim 11, comprising the following steps:
   a. screening a collected original lunar soil sample to obtain a screened lunar soil sample with a particle size below 100 μm;
   b. grinding the screened lunar soil sample under vacuum until the particle size is less than 1 μm, to obtain ground lunar soil; and
   c. heating the ground lunar soil to 150-250° C. under vacuum to collect rare gases adsorbed.

13. The rare gas extraction method according to claim 12, wherein heating temperature in step c is 200° C.

14. The low-energy-consumption in-situ extraction system for lunar rare gas according to claim 1, wherein the grinding device and the heating device are connected by the closed pipe, and the closed pipe is a closed stainless steel pipe.

15. A rare gas extraction method using the low-energy-consumption in-situ extraction system for lunar rare gas according to claim 14, comprising the following steps:
   a. screening a collected original lunar soil sample to obtain a screened lunar soil sample with a particle size below 100 μm;
   b. grinding the screened lunar soil sample under vacuum until the particle size is less than 1 μm, to obtain ground lunar soil; and
   c. heating the ground lunar soil to 150-250° C. under vacuum to collect rare gases adsorbed.

16. The rare gas extraction method according to claim 15, wherein heating temperature in step c is 200° C.

17. A rare gas extraction method using the low-energy-consumption in-situ extraction system for lunar rare gas according to claim 1, comprising the following steps:
   a. screening a collected original lunar soil sample to obtain a screened lunar soil sample with a particle size below 100 μm;
   b. grinding the screened lunar soil sample under vacuum until the particle size is less than 1 μm, to obtain ground lunar soil; and
   c. heating the ground lunar soil to 150-250° C. under vacuum to collect rare gases adsorbed.

18. The rare gas extraction method according to claim 17, wherein heating temperature in step c is 200° C.

\* \* \* \* \*